(12) United States Patent
Zhu

(10) Patent No.: US 8,289,591 B2
(45) Date of Patent: Oct. 16, 2012

(54) SHEET-FED IMAGE SCANNING METHOD AND SCANNING DEVICE THEREOF

(75) Inventor: Ying-Qi Zhu, Suzhou (CN)

(73) Assignee: Qisda (Suzhou) Co., Ltd, Suzhou, Jiangsu Province (CN)

( * ) Notice: Subject to any disclaimer, the term of this patent is extended or adjusted under 35 U.S.C. 154(b) by 354 days.

(21) Appl. No.: 12/728,221

(22) Filed: Mar. 21, 2010

(65) Prior Publication Data

US 2010/0253984 A1 Oct. 7, 2010

(30) Foreign Application Priority Data

Apr. 3, 2009 (CN) .............................. 200910130596

(51) Int. Cl.
*H04N 1/04* (2006.01)
(52) U.S. Cl. ......... 358/498; 358/474; 358/497; 358/496
(58) Field of Classification Search .................. 358/498, 358/474, 496, 497
See application file for complete search history.

(56) References Cited

U.S. PATENT DOCUMENTS
2006/0033262 A1* 2/2006 Stemmle .................. 271/258.01

FOREIGN PATENT DOCUMENTS

| | | |
|---|---|---|
| JP | H08-336014 | 12/1996 |
| JP | 09-156797 | 6/1997 |
| TW | 286849 | 9/1996 |

OTHER PUBLICATIONS

Office Action of Counterpart Application by China Patent Office on May 27, 2010.

* cited by examiner

*Primary Examiner* — Houshang Safaipour

(57) ABSTRACT

A sheet-fed image scanning method and a scanning device thereof are provided. Firstly, a contact image sensor (CIS) scanning element is equipped with at least two sheet-feeding rollers respectively and passively connected with a driven roller, so that the to-be-scanned sheet is fed into/out between the sheet-feeding rollers and the driven rollers. Then, the to-be-scanned sheet is scanned by the CIS scanning element when the to-be-scanned sheet is fed in, and the driven roller is elastically ascended or descended according to the thickness of the to-be-scanned sheet. The invention enables non-contact or low-friction contact scanning between the scan glass window of the scanning device and the to-be-scanned sheet to avoid the to-be-scanned sheet being scratched or damaged and assure the constant-distance scanning to obtain high-quality scanned image. The position of the scanning element can be adjusted to the optimum scanning focal distance according to the thickness of the to-be-scanned sheet.

9 Claims, 3 Drawing Sheets

SHEET-FED IMAGE SCANNING METHOD AND SCANNING DEVICE THEREOF

This application claims the benefit of China application Serial No. 200910130596.6, filed Apr. 3, 2009, the subject matter of which is incorporated herein by reference.

BACKGROUND OF THE INVENTION

1. Field of the Invention

The invention relates in general to an image scanning method and a scanning device thereof, and more particularly to a sheet-fed image scanning method capable of protecting the to-be-scanned sheet and obtaining high-quality scanned image and a scanning device thereof.

2. Description of the Related Art

Scanner is an electronic input device with a wide range of application. The critical components of a scanner include a scanning module and a mechanical transmission portion. Due to the simple structure of the mechanical transmission portion, the sheet-fed scanner can be miniaturized and become a portable input device. The sheet-fed scanner normally adopts a contact image sensor (CIS), which is still with respect to the body of the scanner, and the to-be-scanned document is scanned relative to the movement of the body of the scanner. The method is suitable for small-sized scanners such as portable scanning device for scanning small-sized documents such as photos, checks, business cards, and so on.

Such type of scanning normally adopts sheet-feeding rollers to provide the to-be-scanned sheet with power for feeding paper. The sheet-feeding rollers are located under the scan window of the CIS scanning element. When the to-be-scanned sheet is continually fed in by the sheet-feeding rollers, the sheet-feeding rollers enable the to-be-scanned surface of the to-be-scanned sheet to always have frictional contact with the scan window glass at the scan window. As the friction is large in sliding, when the to-be-scanned document is thick such as a photo and the scanning surface of the to-be-scanned document has an adhesive surface, large friction may occur between the adhesive surface of the photo and the scan window glass so as to scratch or damage the photo. On the other hand, the CIS scanning element is elastically connected, and the ascending/descending of the CIS scanning element can be adjusted according to the thickness of the to-be-scanned sheet. Therefore, the CIS scanning element is always shaking when performing scanning, and may easily result in blurred scanned images but hardly obtain high-quality scanned images.

SUMMARY OF THE INVENTION

The invention provides a sheet-fed image scanning method, which not only enables non-contact or low-friction contact scanning between the scan glass window of the scanning device and the to-be-scanned sheet, but also avoids the to-be-scanned sheet being scratched or damaged and assures the constant-distance scanning performed by the scanning element to obtain high-quality scanned images. Also, the position of the scanning element can be adjusted to the optimum scanning focal distance according to the thickness of the to-be-scanned sheet.

The invention further provides a sheet-fed image scanning device, wherein the scanning device of the sheet-fed image scanning device performs non-contact scanning between the to-be-scanned sheet and the scan glass window, not only avoiding damaging the to-be-scanned sheet but also adjusting the CIS scanning element to the optimum scanning focal distance according to the thickness of the to-be-scanned sheet so as to improve the quality of scanned images.

The technologies adopted in the invention are disclosed below:

A sheet-fed image scanning method adapts a contact image sensor (CIS) as a scanning element. The scanning method includes the following steps. Firstly, a CIS scanning element is equipped with at least two sheet-feeding rollers which are respectively and passively connected with a driven roller, so that the to-be-scanned sheet is fed into/out between the sheet-feeding rollers and the driven rollers. Then, the to-be-scanned sheet is scanned by the CIS scanning element when the to-be-scanned sheet is fed in, and the driven roller are elastically ascended or descended according to the thickness of the to-be-scanned sheet.

To put it more specifically, the scanning method further includes the following steps. The ascending/descending of the driven roller includes a first-level floating program. When the to-be-scanned sheet has a first thickness, the driven rollers perform a first-level floating equivalent to the first thickness so that during the scanning process, the to-be-scanned sheet and the CIS scanning element conform to the scanning condition of the range of optimum scanning focal distance.

The ascending/descending of the driven roller includes a second-level floating program, wherein the shift of the second-level floating is larger than the first-level floating. When the to-be-scanned sheet has a second thickness larger than a predetermined value, the driven rollers, having floated to a predetermined value, perform a second-level floating together with the CIS scanning element. The distance of the second-level floating is the difference between the second thickness and the predetermined value, so that the distance between the scanning surface of the to-be-scanned sheet and the CIS scanning module conforms to the scanning condition of the range of optimum scanning focal distance.

The scanning method includes fixing a sheet-feeding tray between the sheet-feeding rollers for supporting the to-be-scanned sheet, and when no to-be-scanned sheet is fed in, the optimum scanning focal distance of the CIS scanning element is close to the sheet-feeding surface.

The sheet-feeding roller set has two rollers respectively disposed at the two ends of the scanning area of the CIS scanning element, wherein two sets of driven rollers and sheet-feeding rollers are correspondingly disposed, the driven rollers are elastically connected with the CIS scanning element, and when the to-be-scanned sheet is fed in, the driven rollers are elastically ascended/descended with respect to the CIS scanning element and the sheet-feeding rollers.

The supporting frame are elastically connected with the CIS scanning element, and when a to-be-scanned sheet is fed in and the span of elastical ascending/descending of the driven roller is larger than a predetermined value, the driven rollers and the CIS scanning element perform a elastical ascending/descending larger than the predetermined value with respect to the sheet-feeding rollers.

The invention further provides a sheet-fed image scanning device. The scanning device includes a CIS scanning element, at least two sheet-feeding roller sets, and at least two driven roller sets. The sheet-feeding rollers are fixed with respect to the scanning device. The driven rollers respectively form a transmission device with the sheet-feeding rollers, wherein a feeding-channel for to-be-scanned sheet is formed between each driven roller set and each sheet-feeding roller. The driven roller is elastically connected with the CIS scanning element. When the to-be-scanned sheet with a first thickness is fed in, the driven roller performs a first-level floating equivalent to the first thickness according to the thickness of the to-be-scanned sheet.

To put it more specifically, the CIS scanning module are elastically connected with the scanning device, and when a to-be-scanned sheet with second thickness larger than a predetermined value is fed in, the driven rollers, first of all, is floated to a predetermined value, and then the driven rollers and the CIS scanning element are elastically ascended/descended for a second-level floating at the same time. The distance of the second-level floating is the difference between the second thickness and the predetermined value.

There are two sets of sheet-feeding rollers respectively disposed at the front end and the rear end of the scanning direction of the CIS scanning element.

A sheet-feeding tray is fixed on the scanning surface of the CIS scanning element, wherein the sheet-feeding surface of the sheet-feeding tray is aligned with the contact surface between the sheet-feeding rollers and the driven rollers, and when no to-be-scanned sheet is fed in, the optimum scanning focal distance of the CIS scanning element is close to the sheet-feeding surface.

The height of the sheet-feeding surface of the sheet-feeding rollers is lower than that of the outer surface of the scan window of the scanning element, so that after the to-be-scanned sheet is fed in, non-contact scanning is performed between the to-be-scanned surface and the scan glass window.

The top end of the CIS scanning element is connected with the scanning device housing through an elastic element, wherein two driven rollers disposed to the two ends of the CIS scanning element driven rollers disposed through a plurality of spring, a limiting element is disposed on the CIS scanning element, and the driven roller, after having ascended for a predetermined value, is limited by the limiting portion.

The sheet-fed image scanning method and the scanning device thereof dispose driven rollers for supporting a to-be-scanned sheet, so that the to-be-scanned sheet and the CIS scanning element perform low-friction contact or non-contact scanning and avoid the to-be-scanned sheet being damaged when the scan glass window and the to-be-scanned sheet with an adhesive surface (such as photos) are adhered together. The elastical ascending/descending of the driven roller can further adopt multi-level floating according to the thickness of the to-be-scanned sheet. For example, when a to-be-scanned sheet with ordinary thickness is scanned, the driven rollers, first of all, perform a first-level floating equivalent to the paper thickness and then scan the to-be-scanned sheet with larger thickness (such as cards). After the driven rollers are ascended for a predetermined value, the driven rollers and the CIS scanning element together perform a floating different from the thickness of the to-be-scanned sheet, so that the optimum scanning focal distance of the CIS scanning element still matches the distance between the CIS scanning element and the scanning surface of the to-be-scanned sheet so as to obtain high-quality and free-of-defect scanned images.

For the to-be-scanned sheet of various levels of hardness to keep a constant distance without shaking when processing to the underneath of the scan window of the CIS scanning element, a sheet-feeding tray can be fixed under the CIS scanning element. The sheet-feeding tray supports the to-be-scanned sheet and further prevents the to-be-scanned sheet from contacting the CIS scanning element The sheet-fed image scanning method and the scanning device thereof not only enables non-contact or low-friction contact scanning to be performed between the scan glass window of the scanning device and the to-be-scanned sheet but also avoids the to-be-scanned sheet being scratched or damaged and assures constant-distance scanning of the scanning element to obtain high-quality scanned images. Furthermore, the position of the scanning element can be adjusted to the optimum scanning focal distance according to the thickness of the to-be-scanned sheet.

The invention will become apparent from the following detailed description of the preferred but non-limiting embodiments. The following description is made with reference to the accompanying drawings.

BRIEF DESCRIPTION OF THE DRAWINGS

FIG. 2 shows a movement diagram of a to-be-scanned sheet of FIG. 1 being fed in;

FIG. 3 shows a movement diagram of another to-be-scanned sheet of FIG. 1 being fed in;

FIG. 5 shows a structural diagram of a to-be-scanned sheet of FIG. 4 being fed in; and FIG. 6 shows a structural diagram of another to-be-scanned sheet of FIG. 4 being fed in.

DETAILED DESCRIPTION OF THE INVENTION

The sheet-fed image scanning method adopts the disposition of driven rollers to provide support to the to-be-scanned sheet for enabling non-contact or low-friction contact between the scan glass window of the scanning device and the to-be-scanned sheet and avoiding the to-be-scanned sheet being scratched or damaged if the scan window glass and the to-be-scanned sheet with adhesive surface are adhered together.

Figure 1:
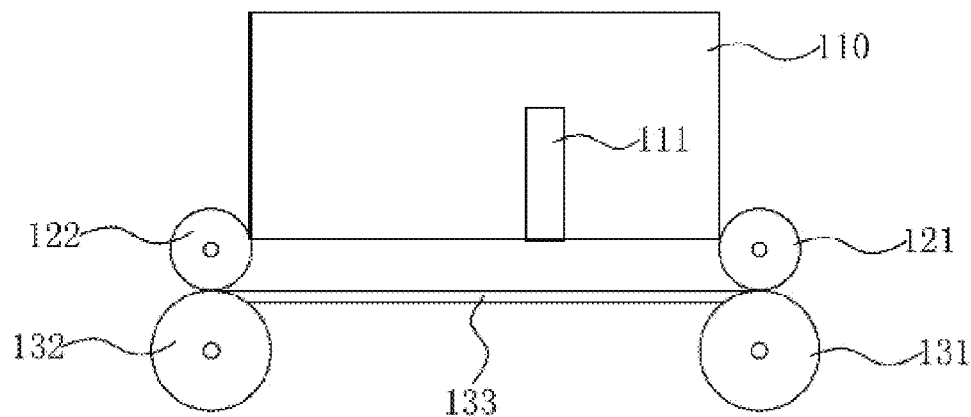
FIG. 1 shows an implementation of the scanning method of the invention.
Figure 2:
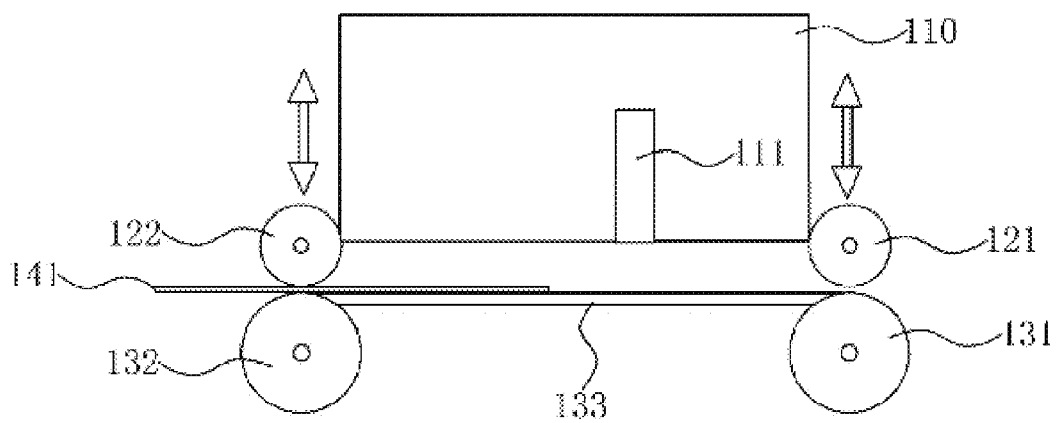
Figure 3:
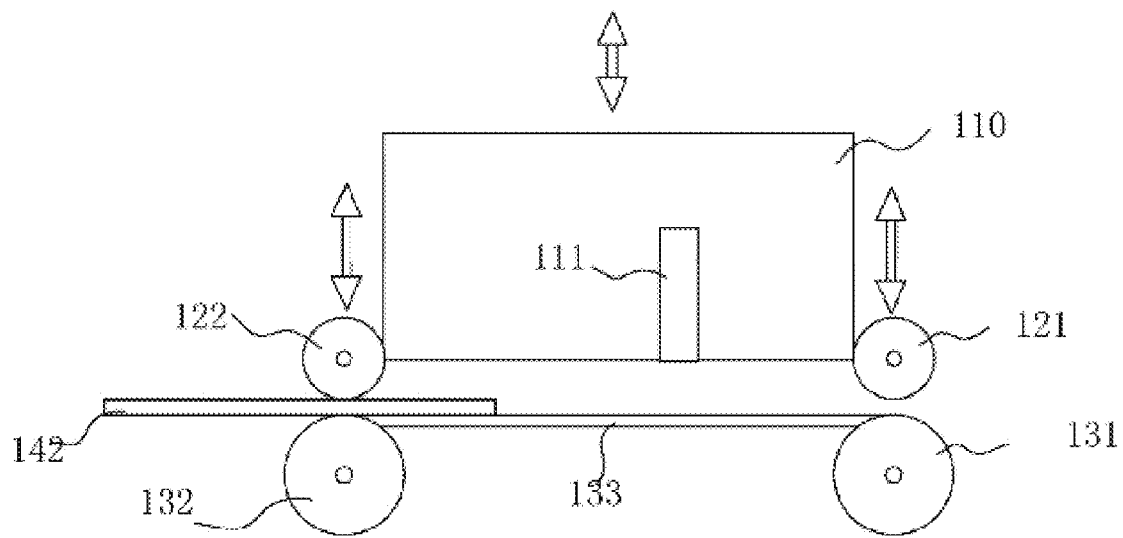

Referring to FIGS. 1~3. FIGS. 1~3 show a sheet-fed image scanning method and the movement of a scanning device. As indicated in FIG. 1, the scanning method adopts a contact image sensor (CIS) as a scanning element 110, wherein the CIS scanning element 110 is further equipped with two sheet-feeding rollers 132 and 131 which can be driven by the same driving motor. The installation frame of the sheet-feeding rollers 131 and 132 is fixed, so the sheet-feeding rollers 131 and 132 will not float upward/downward when the to-be-scanned sheet is fed to the sheet-feeding rollers. Under the CIS scanning element 110, a sheet-feeding tray 133 for supporting the to-be-scanned sheet is fixed between the sheet-feeding rollers 131 and 132 and, and a constant distance is kept between a sheet-feeding surface of the sheet-feeding tray 133 and the CIS scanning element 110. That is, when no to-be-scanned sheet is fed in, the optimum scanning focal distance of the CIS scanning element 110 is close to the sheet-feeding surface of sheet-feeding tray 133. The sheet-feeding surface of the sheet-feeding tray 133 is aligned with the sheet-feeding surface of the sheet-feeding rollers 131 and 132. The two sheet-feeding rollers 131 and 132 respectively are passively connected to the driven rollers 121 and 122. The rotation of the sheet-feeding rollers drives the driven rollers to rotate synchronically. A paper fed-in channel is formed between the driven roller 122 and the sheet-feeding rollers 132, and a paper fed-out channel is formed between the driven roller 121 and the sheet-feeding rollers 131.

After the to-be-scanned sheet is fed to the driven rollers 121 and 122, the driven rollers 121 and 122 are passively and elastically ascended/descended according to the thickness of the to-be-scanned sheet. As indicated in FIG. 2, when the to-be-scanned sheet 141 is fed to the underneath of the CIS scanning element 110 from the space between the sheet-feeding rollers 132 and the driven roller 122, the driven roller 132 is passively and elastically ascended/descended according to the thickness of the to-be-scanned sheet. For example, the thickness of the to-be-scanned sheet 141 is like that of an ordinary scanning paper, such as 0.2 mm, and this thickness is referred as the first thickness. After the to-be-scanned sheet 141 is fed to the driven roller 122, the driven roller 122 is ascended for a first-level floating equivalent to the first thickness, that is, 0.2 mm. Meanwhile, the CIS scanning element 110 remains still with respect to the sheet-feeding rollers. The to-be-scanned surface of the to-be-scanned sheet 141 is exactly within the range of optimum scanning focal distance of the scanning module 111 of the scanning element 110, so that the to-be-scanned sheet 141 is smoothly scanned at a constant focal distance during the feeding process so to obtain high-quality scanned images. After the to-be-scanned sheet is fed in by the sheet-feeding roller 132, the sheet-feeding roller 131 and the driven roller 121 feed out the terminal end of the to-be-scanned sheet 141 to assure the constant and smooth scanning of the entire to-be-scanned sheet 141.

The optimum scanning focal distance of the CIS scanning element 110 on the sheet-feeding surface of the sheet-feeding tray 133 can be set according to the most commonly used functions of the scanning device. For the portable scanner commonly used in business card scanning, the optimum distance can be set as the thickness of common business cards. For the scanning device commonly used in photo scanning, the optimum distance can be set as the thickness of regular photos.

Furthermore, the span of elastical ascending/descending of the driven rollers 121 and 122 is a predetermined value. The predetermined value is larger than the ordinary scanning thickness value, and when the thickness of the to-be-scanned sheet reaches the predetermined value, the driven rollers, first of all, are ascended and floated for the predetermined value, and then the driven rollers and the CIS scanning element together are ascended for a floating value equivalent to the difference between the thickness of the to-be-scanned sheet and the predetermined value. Thus, despite the increase in the thickness of the to-be-scanned sheet exceeds the original optimum scanning focal distance of the CIS scanning element, the CIS scanning element still can be automatically adjusted to keep the to-be-scanned sheet still within the range of optimum scanning focal distance. As indicated in FIG. 3, when the scanning method of the invention is used for scanning the to-be-scanned sheet 142 with larger thickness such as bank cards or other types of cards, the to-be-scanned sheet 142 has a second thickness of about 0.8 mm larger than a predetermined value of 0.4 mm of the floating of the driven rollers 121 and 122. When the to-be-scanned sheet 142 is fed in between the sheet-feeding rollers 132 and the driven roller 122, the driven roller 122 is passively floated for the predetermined value of 0.4 mm, the driven roller 122 and the CIS scanning element 110 together perform a second-level floating. The distance of the second-level floating is equal to the difference between the thickness of the to-be-scanned sheet 142, which is 0.8 mm, and the predetermined value, which is 0.4 mm. Thus, the scanning surface of the to-be-scanned sheet 142 with a larger thickness can be placed within the range of optimum scanning focal distance of the CIS scanning module 111 of the CIS scanning component 110.

According to the scanning method of the invention, during the scanning process, there is a gap between the scanning surface of the to-be-scanned sheet and the glass window of the CIS scanning element, not only achieving non-contact scanning, but also assuring a constant distance between the to-be-scanned sheet and the CIS scanning element (that is, the scanning surface of the to-be-scanned sheet is within the optimum scanning focal distance range) so as to obtain high-quality scanned images. Thus, the CIS scanning element of the scanner will not shake during the scanning process. When scanning a to-be-scanned sheet with larger thickness, the scanning surface of the to-be-scanned sheet with larger thickness still can be placed within the range of optimum scanning focal distance by ascending/descending the driven roller and adjusting the ascending/descending of the CIS scanning element so as to obtain high-quality scanned images.

Figure 4:
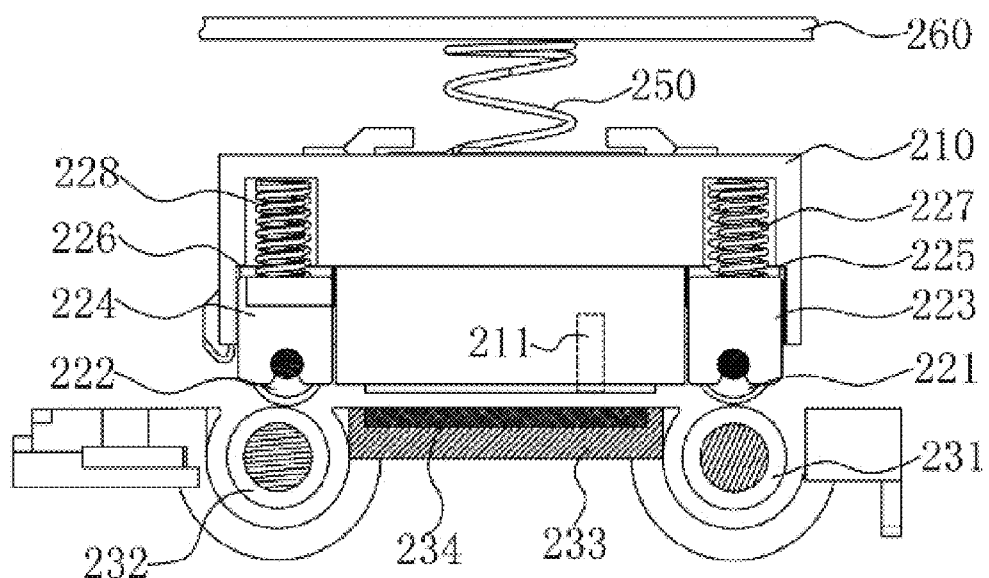
FIG. 4 shows a partial structural diagram of a scanning device of the invention.
Figure 5:
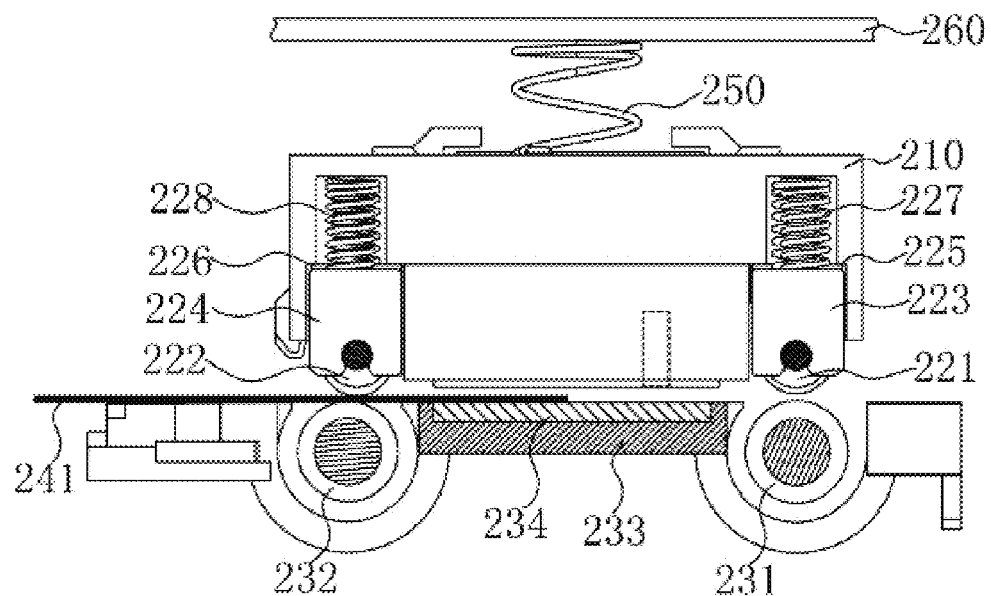
Figure 6:
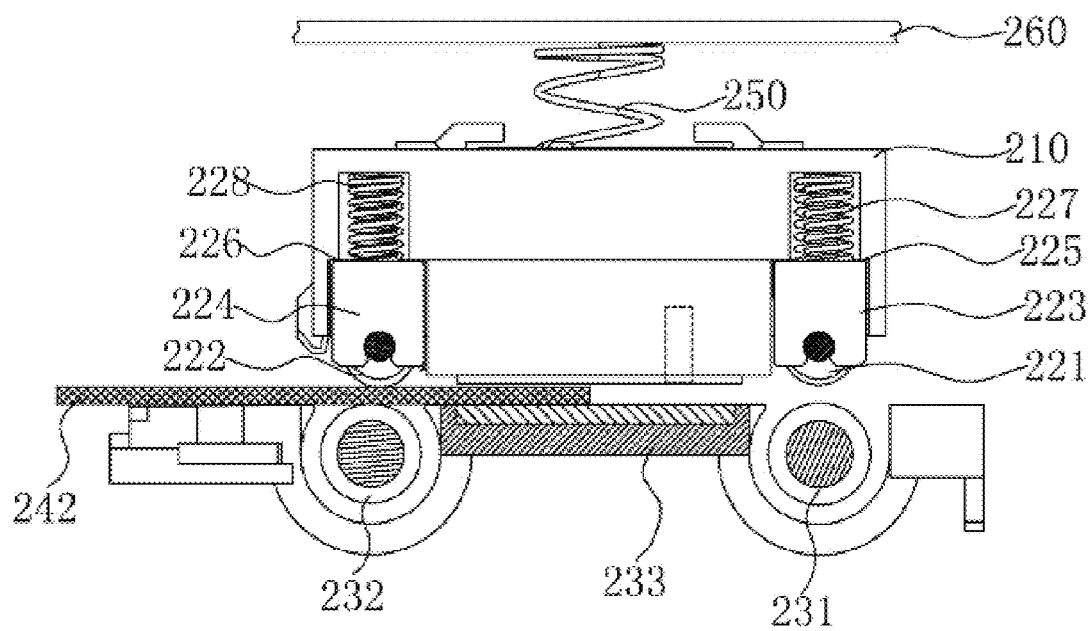

Referring to FIGS. 4~6. FIGS. 4~6 show structural diagram of a sheet-fed image scanning device of the invention and the movement of scanning the to-be-scanned sheet with different thicknesses. The sheet-fed image scanning device can be a small-sized portable scanner or a portable electronic device with scanning function.

As indicated in FIG. 4, the sheet-fed image scanning device includes a CIS scanning element 210. Like an ordinary scanning element, the top end of the CIS scanning element 210 is fixed onto the housing 260 of the scanning device through an elastic element 250, so that the CIS scanning element 210 can be elastically ascended/descended. The CIS scanning element 210 has a CIS scanning module 211 for obtaining scanned image data through a scan glass window. The two ends of the CIS scanning element 210 have two driven rollers 222 and 221, wherein the supporting frames 224 and 223 of the driven rollers 222 and 221 are respectively connected to the frame of the CIS scanning element 110 via the springs 228 and 227. The elastic compression force bearable to the springs 228 and 227 is smaller than the elastic compression force required for deforming the elastic element 250. The supporting frames 224 and 223 of the driven rollers 222 and 221 are located under the limiting elements 226 and 225 of the CIS scanning element 210. The springs cannot be compressed further when the driven rollers 222 and 221 are ascended, and the supporting frames 224 and 223 compress the springs 228 and 227 to ascend to the limiting elements 226 and 225 of the CIS scanning element 210. Meanwhile, the supporting frames 224 and 223 and the CIS scanning element 210 are compressed together through the limiting elements, so that the driven rollers 222 and 221 can be floated to a first-level floating or a second-level floating.

Two sheet-feeding rollers 231 and 232 are respectively disposed under the two driven rollers 221 and 222 for transmission function. The sheet-feeding rollers 231 and 232 are driven by a driving motor to generate a sheet-feeding power. The number of the sheet-feeding rollers and that of the driven roller can be determined according to the size of the scanning device, and are not limited to be two sets as exemplified in the present embodiment of the invention.

The driving axis of the sheet-feeding rollers 232 and 231 being fixed in the scanning device cannot float upward/downward. A sheet-feeding tray 233 is disposed between two sheet-feeding rollers, wherein the sheet-feeding surface of the sheet-feeding tray 233 is aligned with the sheet-feeding surface of the sheet-feeding rollers 231 and 232. After the to-be-scanned sheet is fed through the sheet-feeding rollers, the fed-in end of the to-be-scanned sheet being supported by the sheet-feeding tray 233 moves forward smoothly. There is a gap between the sheet-feeding tray 233 and the scan glass window of the CIS scanning element 210, so that there is no contact between the to-be-scanned surface and the scan glass window, and the scan glass window will not scratch or damage the to-be-scanned sheet.

A friction pad 234 for increasing friction can further be pasted on the sheet-feeding surface of the sheet-feeding tray 233, so that the to-be-scanned sheet can slide smoothly on the sheet-feeding tray 233.

As indicated in FIG. 5, when the to-be-scanned sheet 241 with first thickness such as a photo enters the scanning area of the CIS scanning element 210 via the channel between the driven roller 222 and the sheet-feeding rollers 232, the driven rollers 222 and 221 are passively and elastically ascended for a floating equivalent to the first thickness. As the first thickness is smaller than the distance between the upper edge of the supporting frame of the driven rollers 222 and 221 and the limiting element on the CIS scanning element 210, after the driven rollers are ascended for the first thickness, the CIS scanning element 210 still remain still with respect to the sheet-feeding rollers 232, 231. Thus, when the to-be-scanned sheet 241 is scanned, the scanning surface of the to-be-scanned sheet 241 is always within the range of optimum scanning focal distance so as to obtain high-quality images.

As indicated in FIG. 6, the to-be-scanned sheet 242 with a second thickness such as 1.0 mm can be a bank card. The distance between the supporting frames 224 and 223 of the driven rollers 222 and 221 and the limiting elements 226 and 225 of the CIS scanning element 210 is 0.6 mm. When the to-be-scanned sheet 242 is fed in via the channel between the driven roller 222 and the sheet-feeding rollers 232, the driven roller 222, first of all, is passively ascended for a predetermined value of 0.6 mm. Then, due to the function of the limiting portions 226 and 225, the driven rollers 222 and 221 and the CIS scanning element 210 are together ascended for 0.4 mm. Thus, the scanning surface of the to-be-scanned sheet 242 still remains within the range of optimum scanning focal distance of the CIS scanning element 210. The scanning method of the invention avoids the defect caused by the current scanning device, the portable scanning device in particular, which has narrow range of scanning thickness and cannot satisfy the to-be-scanned sheet with different levels of thickness, so as to obtain high-quality scanned images.

According to the present embodiment of the invention, the driven rollers and the driven rollers can be ascended/descended synchronically by means of a synchronically positioning device or can be ascended/descended individually according to whether the to-be-scanned sheet is touched. The above two ways do not make much difference in terms of effects. Also, the ascending/descending of the CIS scanning element can be made even smoother by a navigating device for navigating the ascending/descending of the CIS scanning element.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sheet-fed image scanning method adapting a contact image sensor (CIS) as a scanning element, wherein the scanning method comprises:
    equipping the CIS scanning element with at least two sheet-feeding rollers connected with a driven roller for enabling a to-be-scanned sheet to be fed into/out between the sheet-feeding rollers and the driven roller;
    the driven roller performing elastical ascending/descending according to the thickness of the to-be-scanned sheet when the to-be-scanned sheet is fed in, wherein the CIS scanning element performs constant distance scanning with respect to the to-be-scanned sheet;
    wherein the scanning method further comprises the ascending/descending of the driven roller comprises a first-level floating program, and when the to-be-scanned sheet has a first thickness, the driven rollers perform a first-level floating equivalent to the first thickness so that during scanning process, the to-be-scanned sheet and the CIS scanning element conform to the scanning condition of the range of optimum scanning focal distance;
    wherein the ascending/descending of the driven rollers comprises a second-level floating program, the shift of the second-level floating is larger than the shift of the first-level floating, and in the to-be-scanned sheet having a second thickness larger than a predetermined value, the driven rollers first is floated to a predetermined value and then perform a second-level floating together with the CIS scanning element, wherein the distance of the second-level floating is the difference between the second thickness and the predetermined value, so that the distance between the scanning surface of the to-be-scanned sheet and the CIS scanning module conforms to the scanning condition of the range of optimum scanning focal distance.

2. The sheet-fed image scanning method according to claim 1, wherein the scanning method comprises:
    an sheet-feeding tray is fixed between the sheet-feeding rollers for supporting the to-be-scanned sheet, and when no to-be-scanned sheet is fed in, the optimum scanning focal distance of the CIS scanning element is close to a sheet-feeding surface of the sheet-feeding tray.

3. The sheet-fed image scanning method according to claim 1, wherein the CIS scanning element includes two sheet-feeding roller respectively disposed at two ends of the scanning area of the CIS scanning element, two sets of driven rollers and sheet-feeding rollers are correspondingly disposed, the driven rollers are elastically connected with the CIS scanning element, and when the to-be-scanned sheet is fed in, the driven rollers are elastically ascended/descended with respect to the CIS scanning element and the sheet-feeding rollers.

4. The sheet-fed image scanning method according to claim 3, wherein the supporting frame of the CIS scanning element are elastically connected with the CIS scanning element, and when a to-be-scanned sheet is fed in and the span of elastical ascending/descending of the driven roller is larger than a predetermined value, the driven rollers and the CIS scanning element perform a elastical ascending/descending larger than the predetermined value with respect to the sheet-feeding rollers.

5. A sheet-fed image scanning device comprises:
    a CIS scanning element;
    at least two sheet-feeding rollers, wherein the sheet-feeding rollers are fixed with respect to the scanning device;
    at least two driven roller, wherein the driven rollers transmissibly disposed with the sheet-feeding rollers respectively, and a fed-in/out channel is formed between each set of driven roller and sheet-feeding roller;
    the driven roller elastically connected with the CIS scanning element, wherein when the to-be-scanned sheet with a first thickness is fed in, the driven roller performs a first-level floating equivalent to the first thickness according to the thickness of the to-be-scanned sheet;
    wherein the CIS scanning module is elastically connected with the scanning device, and when a to-be-scanned sheet with a second thickness larger than a predetermined value is fed in, the driven rollers first performs a floating of a predetermined value, and then the driven rollers and the CIS scanning element are together elastically ascended/descended for a second-level floating at the same time, and the distance of the second-level floating is the difference between the second thickness and the predetermined value.

6. The sheet-fed scanning device according to claim 5, comprises:
two sets of sheet-feeding rollers respectively disposed at the front end and the rear end of the scanning direction of the CIS scanning element.

7. The sheet-fed image scanning device according to claim 5, wherein a sheet-feeding tray is fixed on the scanning surface of the CIS scanning element, the sheet-feeding surface of the sheet-feeding tray is aligned with the contact surface between the sheet-feeding rollers and the driven roller, and when no to-be-scanned sheet is fed in, the optimum scanning focal distance of the CIS scanning element is close to the sheet-feeding surface.

8. The sheet-fed image scanning device according to claim 5, wherein the height of the sheet-feeding surface of the sheet-feeding rollers is lower than the height of the outer surface of the scan window of the scanning element, so that after the to-be-scanned sheet is fed in, non-contact scanning is performed between the to-be-scanned surface and the scan glass window.

9. The sheet-fed image scanning device according to claim 5, wherein the top end of the CIS scanning element is connected with the housing of the scanning device through an elastic element, two driven rollers disposed to the two ends of the CIS scanning element through a plurality of the spring, a limiting element is disposed on the CIS scanning element, and the driven roller, after having ascended for a predetermined value, is limited by the limiting portion.

* * * * *